Figure 1:
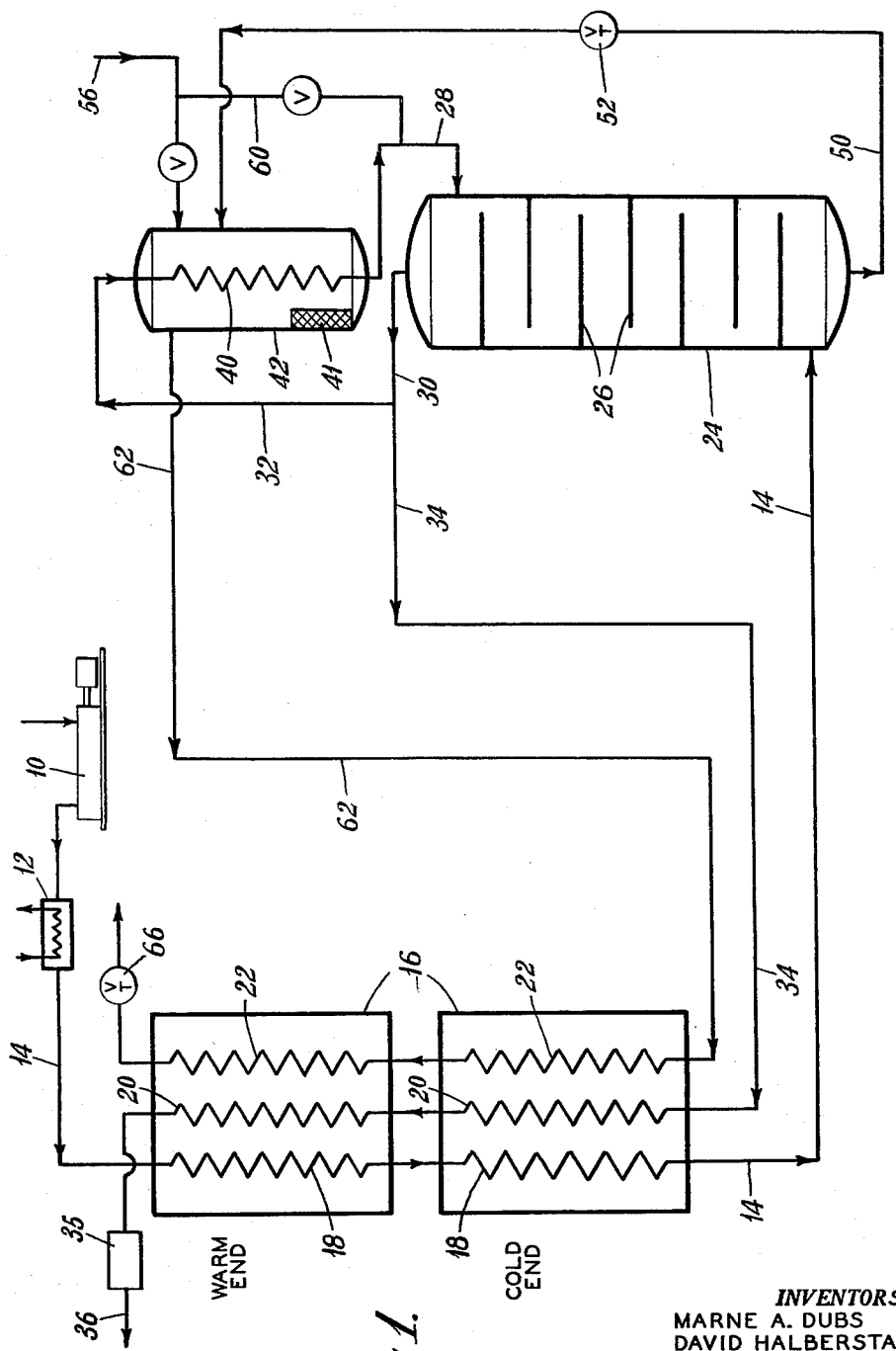

INVENTORS
MARNE A. DUBS
DAVID HALBERSTAM
MARSHALL S. LIPMAN
EUGENE L. MALINOWSKI

BY *William F. Mesinger*
ATTORNEY

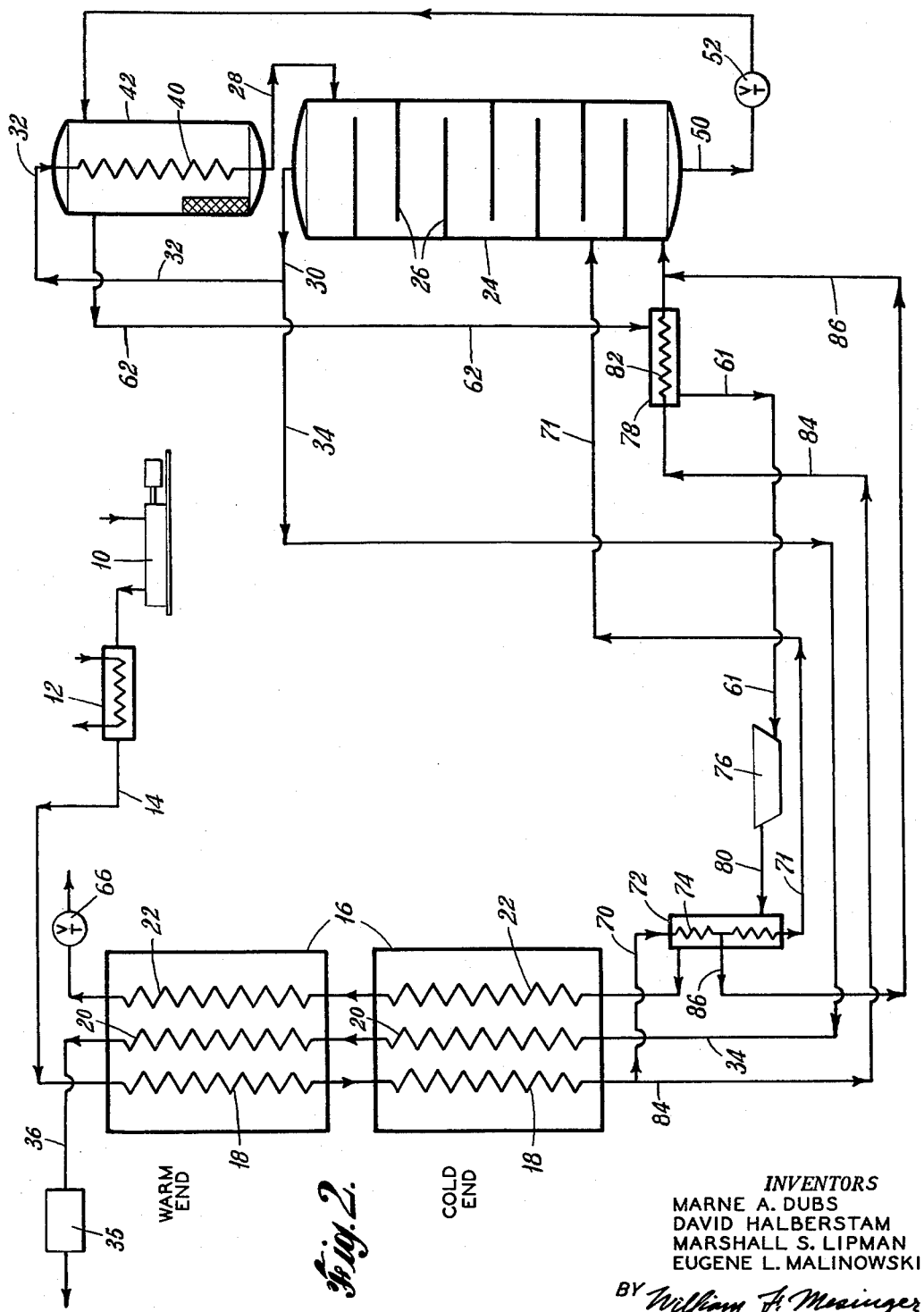

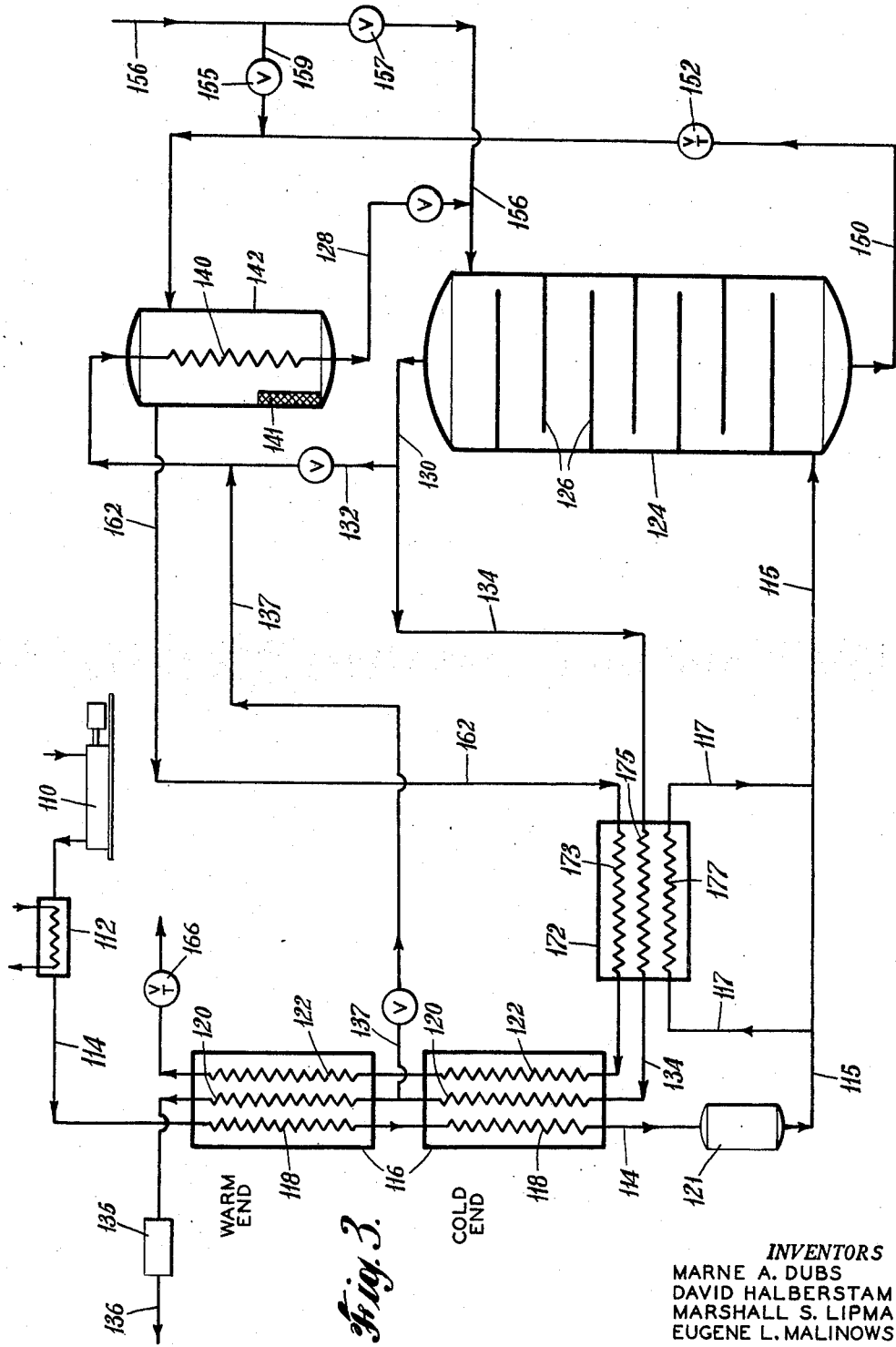

United States Patent Office  3,210,947
Patented Oct. 12, 1965

3,210,947
PROCESS FOR PURIFYING GASEOUS STREAMS BY RECTIFICATION
Marne A. Dubs, Kenmore, David Halberstam, New City, Marshall S. Lipman, Tonawanda, and Eugene L. Malinowski, Buffalo, N.Y., assignors to Union Carbide Corporation, a corporation of New York
Filed Apr. 3, 1961, Ser. No. 100,464
5 Claims. (Cl. 62—13)

This invention relates to a process of and apparatus for upgrading compressed gas mixtures and more particularly to process and apparatus for the upgrading of an impure nitrogen stream, having oxygen and argon as principal impurities or a nitrogen stream contaminated with carbon dioxide and water in addition to the oxygen and argon impurities.

The main objective of large tonnage air separation plants is to provide an ultra-high purity oxygen product for use in various steel producing operations. The nitrogen product resulting from the air separation operation is used primarily to flush out atmospheric impurities which are separated from the incoming air stream by condensation along the paths of reversing heat exchangers or by condensation in a regenerator while at the same time recovering the refrigeration from the nitrogen waste stream.

Prior art methods of recovering a high-purity nitrogen stream from conventional air separation plants may be divided into two major classes. The first class consists of utilizing a side column adjacent to and in series flow relationship with the main rectification column. Such an arrangement severely restricts the amount of impure nitrogen that can be handled and further this arrangement severely restricts operating pressures and temperatures of the upgrading process because the latter must operate at conditions dictated by the main column.

Such operation restricts the flexibility of the process by allowing only one feed pressure to be used by the column adjacent to and in series with the main rectification column. For example, it may be desirable to deliver a purified product at a higher pressure than could possibly be delivered if an impure feed stream at upper-column pressure were employed as the feed stream, further; it is well known the higher the pressure the better the impurity removal. If the feed pressure of the stream to be purified is thus limited, the size of the purification unit must necessarily increase to process a given throughput and still achieve a substantially pure product.

The second class of prior art practice consists of placing a high-purity nitrogen section above or on top of an upper column. A high-purity nitrogen product is withdrawn from the top of the column and a lower purity nitrogen waste stream is withdrawn from a location several trays below the top of the column. Operating a high-purity nitrogen column at upper column pressure in accordance with this scheme means that the nitrogen product purity is limited by the purity of the shelf nitrogen reflux liquid obtainable from the top of the high pressure column. Each of these classes, in addition to the disadvantage enumerated, possess a common disadvantage in that their use severely impedes the plant operations. If they are not structurally incorporated into the original plant, extensive construction modification is required with the result that the plant must be shut down during the changeover period.

One object of this invention is to supply the low-temperature separation art with a process of and apparatus for upgrading gas mixture streams that may be conveniently and economically used in conjunction with existing gas-separation plants without elaborate construction modification or costly plant shutdowns.

Another object of the present invention is to provide process and apparatus for upgrading compressed impure (90–98%) nitrogen derived from an air separation column to ultra-high purity (99.99% nitrogen) by a low-temperature rectification unit added to an air separation plant, without the need for extensive alterations.

A further object of the present invention is to provide process and apparatus for upgrading compressed impure nitrogen derived from the waste stream of air separation plants and contaminated with carbon dioxide and water.

These and other objects and advantages of the invention will become apparent from the following description and the accompanying drawings showing exemplary systems for upgrading gas mixtures, such as impure nitrogen, according to the invention.

In the drawings:
FIG. 1 is a schematic flow diagram of a high-purity nitrogen upgrading system in which the necessary refrigeration is supplied by an independent source of liquid nitrogen.
FIG. 2 is a schematic flow diagram of a high-purity nitrogen upgrading system in which the necessary refrigeration is supplied by turbo-expansion of impure condenser vapor.
FIG. 3 is a schematic flow diagram of a high-purity nitrogen upgrading system in which the impure nitrogen to be upgraded is obtained from the waste stream of a conventional air separation plant and where the necessary refrigeration is supplied by an independent source of liquid nitrogen.

In the drawings, similar items of apparatus in the several figures are designated by similar reference characters for purposes of clarity.

According to the present invention an impure gas mixture stream, having 90–98% nitrogen, to be upgraded by low temperature rectification is cooled to a temperature near its dew point by passage along a first cooled path in a non-reversing heat exchange zone. A second gaseous stream obtained from an evaporating impure wash liquid is passed at a low temperature in thermal association with the first path but countercurrent thereto in a second non-reversing path. A high-purity third gaseous product stream is also passed at a low temperature in thermal association with the first path and countercurrent thereto in a third non-reversing path.

The impure gas mixture stream, after it has been sufficiently cooled in the aforementioned manner, is passed into a rectification column where it is rectified against reflux liquid nitrogen flowing counter-current thereto. The upgraded nitrogen stream emerging as effluent from the top of the rectification column is extremely pure—at least 99.99% nitrogen. Upon leaving the rectification zone the high-purity nitrogen is divided into two streams, one a vapor stream, the other a product stream. The vapor stream is subsequently condensed against impure reflux liquid from the bottom of the distillation column in a reflux condenser. The now liquefied high-purity nitrogen is returned to the top of the distillation column as high-purity reflux liquid. A make-up liquid nitrogen refrigerant or other liquid having proper temperature conditions is also introduced into the boiling side of the reflux condenser along with the impure reflux liquid from the distillation column. The make-up liquid is used to provide refrigeration as required in the absence of other refrigeration producing means, such as an expander or gas refrigerator. The vapor generated on the boiling side of the reflux condenser as a result of condensing the high-purity nitrogen vapor stream is removed from the reflux condenser and warmed against the incoming gas mixture stream as previously described. The boiling-side vapor, after it has been rewarmed, is throttled as necessary to provide sufficient pressure in the reflux condenser to permit control of the condensing pressure of the column reflux stream.

The necessary refrigeration for the reflux condenser is supplied by boiling the throttled liquid from the bottom of the rectification column along with the additional make-up liquid supplied from an outside source, if the latter is employed.

The warmed, high-purity nitrogen product is passed out of the system after recovering its refrigeration in the aforedescribed manner.

In one embodiment of the invention an impure nitrogen stream, contaminated with moisture and carbon dioxide, is upgraded to 99.99% purity. The impure, contaminated stream is cooled in reversing type heat exchangers in lieu of the non-reversing type employed when contaminants such as moisture and carbon dioxide are absent from the incoming gas mixture stream. As used herein the term "impure" refers to those impurities which are present in the incoming feed stream but are not removed by condensation along the flow paths of a heat exchange zone but are removed by rectification in the distillation column. The term "contaminants" refers to those impurities present in the incoming feed stream which are removed from the feed stream before the feed stream is introduced to the rectification zone. A liquid make-up stream having suitable temperature characteristics is employed to provide the necessary refrigeration to the system. The amount of liquid make-up added to the system for this particular embodiment will accordingly be reduced if other refrigeration producing means are employed, such as an expander or gas refrigerator.

When the impure gas mixture stream is contaminated with moisture and carbon dioxide, higher feed pressures are necessary in order that self-cleaning may be maintained in the reversing heat exchange zones. In order to avoid a build up of ice and carbon dioxide solid particles in such heat exchange zone, the zone must be "self-cleaning." This means that substantially all of the contaminants deposited in the zone during an intake must be evaporated and swept out during the next succeeding product gas stroke. The self-cleaning condition may not be achieved by simply passing all of the outgoing product gas through the reversible heat exchange zone because compressed feed stream, principally nitrogen and oxygen, has a greater specific heat than the non-compressed products of separation, e.g. pure nitrogen and the impure nitrogen waste stream.

Referring now to the drawings and particularly to FIG. 1, this embodiment will be illustrated with typical flow rates, temperatures and pressures. Impure nitrogen (96.7% $N_2$, 2.0% $O_2$ and 1.3% A) at a flow rate of 118,500 c.f.h. measured at normal pressure and temperature (NTP) is compressed in compressor 10 and the heat of compression removed by after-cooler 12. The compressed gas at a temperature of about 20° C. and a pressure of 35 p.s.i.g. is discharged into conduit 14 for passage to heat exchange path 18 in the warm end of the non-reversing heat exchange zone 16. The impure, compressed nitrogen stream flowing in path 18 is countercurrently cooled by a product stream flowing in non-reversing path 20 and a waste stream flowing in non-reversing path 22 located within non-reversing heat exchanger 16. It is to be understood that the heat exchange zone employed herein may comprise accumulative-type heat exchangers or passage exchanging heat exchangers, as illustrated, or a combination thereof. Both types are well-known to those skilled in the art, cold accumulators and their operation being described in U.S. Patent 1,890,646 to M. Frankl, and passage exchanging units being described in U.S. Patent 2,460,859 to P. R. Trumpler. In low temperature separation plants, it is usually more economical to use passage exchanging heat exchangers rather than embedded coil type accumulators for the production of clean product streams free of water and carbon dioxide contaminants. The cold, impure nitrogen feed stream is discharged from the cold end of non-reversing heat exchanger 16 into conduit 14 at a temperature of about −184° C. and a pressure of about 32 p.s.i.g. The cold, impure nitrogen vapor is introduced to rectification column 24 having contact trays 26 therein. The cold, impure nitrogen vapor is contacted on trays 26 of column 24 with nitrogen reflux liquid introduced at the top of column 24 by means of conduit 28. The argon and oxygen impurities originally present in the incoming nitrogen stream are thereby transferred to the nitrogen reflux liquid flowing counter-currently to the impure nitrogen vapor to be upgraded. A high-purity (99.99%) nitrogen product effluent emerges from the top of column 24 through conduit 30 at a pressure of about 30 p.s.i.g. and a temperature of about −185° C. The high-purity nitrogen effluent flowing in conduit 30 is subsequently divided into a high-purity product stream flowing in conduit 34, and a high-purity vapor flowing in conduit 32. The product to vapor volumetric flow ratio may for example be about 1.3 measured at NTP. The high-purity product flowing in conduit 34 is passed to heat exchange path 20 in the cold end non-reversing heat exchange 16 where its refrigeration is recovered. The high-purity nitrogen product emerges from path 20 in the warm end of non-reversing heat exchange zone 16 at a temperature of about 12° C. High-purity product pressure and flow regulating means 35 in flow conduit 36 are used to regulate the pressure and flow as desired. The high-purity vapor stream flowing in conduit 32 is passed to heat exchange path 40 located in reflux condenser 42. Impure nitrogen reflux liquid is withdrawn from the lower part of column 24 through conduit 50 at a flow rate, equivalent to 48,500 c.f.h. at NTP, at a pressure of about 32 p.s.i.g. and a temperautre of −184° C., throttled by means of valve 52 to about 15 p.s.i.g. thereby reducing its temperature to about −186° C. and passed to reflux condenser 42 wherein it is boiled thereby condensing the high-purity vapor in path 40. The composition of the liquid withdrawn from the bottom of column 24 is approximately 92.5% $N_2$, 4.9% $O_2$ and 2.6% A. The high-purity vapor condensed by the boiling impure liquid is withdrawn from path 40 and passed to conduit 28 whereupon it is introduced to the rectification column as high-purity reflux liquid. Liquid nitrogen make-up from an independent source is introduced to reflux condenser 42 by means of conduit 56 for the purpose of providing the necessary refrigeration to the system. If the make-up stream were obtained from a source such as a storage tank so that its purity could be relied upon, the liquid could be introduced directly into the top of column 24 by means of conduit 60. The advantage of introducing the liquid make-up into reflux condenser 42 directly is that brief purity changes can be tolerated without causing the impurity to appear in the high-purity product stream.

If a stream of 99.99% liquid nitrogen were available in sufficient quantity from a reliable external source for liquid reflux, the reflux condenser 42 could be reduced in size to that necessary to evaporate the impure wash liquid from the bottom of column 24. Because of the danger of introducing impurities into the system by means of direct independent reflux liquid introduction means, only the refrigeration requirements are supplied from without the system and the bulk of the reflux liquid is produced in the reflux condenser 42. To insure adequate impurity removal, adsorption traps 41 containing for example silica gel may be installed on the boiling side of reflux condenser 42.

The vapor resulting from the evaporating impure liquid on the boiling side of heat exchange path 40 is discharged from reflux condenser 42 through conduit 62. The vapor subsequently flows through non-reversing heat exchange path 22 in non-reversing heat exchange zone 16 where it surrenders its refrigeration to the incoming feed stream in path 18. The amount of vapor emerging from path 22 and discharged into conduit 68 is approximately 52,150 c.f.h. measured at NTP and is at a pressure of 11.5 p.s.i.g. and a temperature of about 12° C. and has an approximate composition as follows: 93% $N_2$, 4.6% $O_2$ and 2.4% A. The warmed vapor flowing in conduit 68 is throttled in valve 66 before it is passed to the atmosphere or for further processing as desired. The amount of throttling will depend principally upon the purity of the incoming feed stream flowing in conduit 14. Lower purity feed streams containing higher condensing constituents would require less throttling at valve 66 than higher purity feed streams to provide a particular condensing temperature within the reflux condenser 42. Likewise, a lower purity liquid make-up stream 56 would require less throttling at valve 66. Thus, the pressure differential across the reflux condenser 42 may be increased by throttling at 66 and thereby require less heat transfer area therein. Alternately, the desired boiling pressure within reflux condenser 42 may be achieved by designing increased pressure drop into heat exchange passage 22 of non-reversing heat exchange zone 16 in lieu of valve 66. Also, if necessary to reduce the pressure in condenser 42 below atmospheric to secure a particular temperature therein, conduit 34 may be vacuum-pumped if desired.

The embodiment of the instant invention as illustrated in FIG. 2 is similar in operation to that of FIG. 1 except that refrigeration requirements for the system are produced within the cycle. Structural features of this illustration (FIG. 2) common to FIG. 1 have similar numerical designation. Impure nitrogen is compressed in compressor 10 and the heat of compression is removed by after-cooler 12. The impure, compressed nitrogen is discharged into non-reversing heat exchange path 18 of non-reversing heat exchange zone 16 at about 20° C. and 40 p.s.i.g. where it is countercurrently cooled against product and waste streams flowing in non-reversing paths 20 and 22 respectively of non-reversing heat exchange zone 16. The cold, impure feed gas emerging from path 18 in the cold-end of non-reversing heat exchange zone 16 at about −175° C. is divided into a major and minor portion. A minor portion of the impure feed stream about 38% by volume, is diverted to conduit 70 where it is discharged into heat exchange path 74 located in superheater 72 for further cooling against a work-expanded fluid from turbine 76. Any liquid resulting from the cooling of the minor stream in path 74 is diverted to conduit 86 and passed into distillation column 24. The still vaporous impure feed stream emerging from the cold-end of superheater 72 is discharged into conduit 71 and subsequently passed to distillation column 24 having contact trays 26 therein whereupon the impure vapor is upgraded by nitrogen reflux flowing countercurrently thereto. The cold major portion of the impure feed stream emerging from heat exchange path 18 in the cold end of non-reversing heat exchange zone 16 is discharged into conduit 84 and is further cooled against vapor discharged from reflux condenser 42 in heat exchanger path 82 located in turbine preheater 78 and passed to distillation column 24 for upgrading. A high-purity nitrogen effluent is discharged from the top of column 24 in conduit 30 whereupon it is divided into a product stream flowing in conduit 34 and a vapor stream flowing in conduit 32. The product stream flowing in conduit 34 is passed to non-reversing heat exchange path 20 located in the cold-end of non-reversing heat exchange zone 16 where it is warmed against the incoming impure feed stream. The warmed product stream is discharged from path 20 in the warm-end of non-reversing heat exchange 16 to conduit 36 where its flow and pressure are regulated by controller 35. The high-purity vapor stream flowing in conduit 32 is directed to heat exchange path 40 in reflux condenser 42 where it is liquefied against cold, impure reflux liquid which has been discharged from the bottom of column 24 through conduit 50 and throttled by means of valve 52 for passage to the boiling side of heat exchange path 40 in reflux condenser 42. The now liquefied high-purity vapor stream emerging from heat exchange path 40 is discharged into conduit 28 whereupon it is returned to the top of distillation column 24 as high-purity liquid reflux. The cold vapors generated on the boiling side of heat exchanger path 40 are discharged from reflux condenser 42 into conduit 62, warmed in turbine preheater 78 against the major portion of the incoming feed stream flowing in conduit 84 and passed through conduit 61 to the inlet of turbine 76 for work expansion therein to produce the necessary cycle refrigeration. The turbine working fluid enters turbine 76 by means of conduit 61 for example at about 22 p.s.i.g. and −187° C. and is discharged therefrom in conduit 80 at about 3 p.s.i.g. and −190° C. and is warmed against the minor portion of the impure feed stream entering superheater 72 by means of conduit 70. The cold vapor emerging from superheater 72 is passed to non-reversing heat exchange path 22 in the cold-end of non-reversing heat exchange zone 16 and further passed to path 22 in the warm-end of non-reversing heat exchange zone 16 where it is further warmed against the incoming feed stream and discharged to the atmosphere or for further processing as desired.

FIG. 3 illustrates still another embodiment of the instant invention wherein the impure nitrogen feed stream to be upgraded is withdrawn from the reversing heat exchangers or cold recuperators of an air separation plant (not illustrated) contaminated with moisture and carbon dioxide in addition to oxygen and argon impurities. The impurse, contaminated feed stream received from the aforementioned source is compressed to a pressure below 75 p.s.i.g., for example 55 p.s.i.g., in compressor 110, cooled in after-cooler 112 and passed to reversing heat exchange path 118 in the warm-end of reversing heat exchange zone 116. The contaminants present in the impure feed stream are subsequently removed by condensation along reversing heat exchange path 118 in the cold-end of reversing heat exchange zone 116 and discharged into conduit 114 for passage to adsorbent gel-trap 121 for additional contaminant removal. The impure, cooled feed stream is discharged from gel trap 121 into conduit 115. A portion of the impure, cooled feed stream flowing in conduit 115 is diverted to product superheater 172 by means of conduit 117 where the diverted portion of the cooled, impure feed stream is further cooled in heat exchange path 177 against a product stream flowing in heat exchange path 175 and a waste stream flowing in heat exchange path 173. The further cooled portion of the feed stream is subsequently recombined with the cooled feed stream in conduit 115 and introduced to distillation column 124 having contact trays 126 therein. The non-contaminated, impure feed stream is contacted in column 124 with a reflux liquid flowing countercurrent thereto whereupon the feed stream is upgraded by removal of the non-condensing impurities present in the original impure, contaminated feed stream. A high-purity nitrogen effluent is discharged from the distillation column 124 into conduit 130 whereupon the effluent is divided into a high-purity product stream flowing in conduit 134 and a high-purity vapor stream flowing in conduit 132. The high-purity product stream flowing in conduit 134 is passed to heat exchange path 175 in product superheater 172 for warming against the incoming feed stream flowing in path 177. The high-purity product stream is partially warmed in non-reversing heat exchange path 130 in the cold-end of reversing heat exchange zone 116. A portion of the partially warmed high-purity product is withdrawn by means of conduit 137 from an intermediate thermal level of the reversing heat exchange zone 116 and combined with the high-purity vapor product flowing in conduit 132. A portion of the high-purity product is withdrawn from the reversing heat exchange zone for the purpose of creating flow unbalance therein. The necessity for flow unbalance in low temperature rectification operations is to maintain self-cleaning in reversing heat exchange paths. The combined partially warmed product from the reversing heat exchange zone and the high-purity vapor from the top of column 124 are discharged into heat exchange path 140 in reflux condenser 142 where it is liquefied against cold, impure reflux liquid which has been discharged from the bottom of column 124 through conduit 150 and throttled by means of valve 152 for passage to the boiling side of heat exchange path 140 in reflux condenser 142. The liquefied stream of high-purity liquid is removed from path 140 and passed to conduit 128 for passage to the distillation column 124 as high-purity reflux therefor. The cold vapors generated on the boiling side of heat exchange path 140 are discharged from reflux condenser 142 into conduit 162, warmed in heat exchange path 173 in product superheater 172 and passed to heat exchange path 122 in the cold and warm ends of reversing heat exchange zone 116. The warmed vapors emerging from path 122 at the warm-end of reversing heat exchange zone 116 are discharged to the atmosphere or for further processing as desired. In lieu of the passage type reversing heat exchange zone 116 discussed and illustrated herein, embedded coil type accumulators may be employed. In this instance reversing heat exchange path 118 of the reversing heat exchange zone 116 would be the regenerative mass of the cold accumulator or recuperator having paths similar to paths 120 and 122 of the present illustration embedded therein. The refrigeration requirements for this particular embodiment are supplied by the addition of liquid nitrogen make-up received from an independent source. The liquid make-up is admitted to the system by means of conduit 156 and may be introduced into the system by passage into reflux condenser 142 from branch conduit 159, the amount of make-up being controlled by valve 155, or the make-up may be admitted to the top of the rectification column by valve 157 in conduit 156 as reflux liquid. The choice of where the liquid nitrogen make-up may be added is governed by the same considerations as previously discussed.

For the foregoing detailed descriptions it is obvious that FIG. 3 may be modified in a manner similar to FIG. 2 to produce the refrigeration requirements of the system within the cycle by the addition of a turbine and consequently reduce or eliminate the need for outside liquid make-up.

The scope of the instant invention is not limited exclusively to the upgrading of impure, contaminated waste nitrogen streams obtained from air separation plants or other convenient sources. The instant invention may also be used to upgrade the heating value of various natural gas streams or of upgrading specific gas mixtures resulting from helium-natural gas separation steps. The apparatus necessary for the instant invention may be connected to a natural gas pipeline at any location. For example, for a given existing prior art nitrogen-methane separation plant by washing or rectification it may become desirable to increase the capacity of the system or achieve a higher purity product than is presently attainable. It would be necessary therefore to remove the impurity from the remaining mixture in order to restore or increase the heating value of the gas. In order to avoid extensive modifications to existing equipment, such as additional column trays, and the like, which would involve considerable expensive plant outage time, it is preferable to provide additional equipment which involves only a brief outage time for making ambient temperature tie-ins into existing piping. In such a contemplated process, a compressed feed gas mixture of methane and nitrogen at near ambient temperatures is cooled and passed into a rectification column. Nitrogen gas is withdrawn at the top of the column, a portion is condensed against methane liquid and used as column reflux and the remainder is warmed countercurrently against incoming feed gas and subsequently discharged as waste. The upgraded methane gas from the boiling side of the reflux condenser is also warm countercurrently against the incoming feed gas as the product stream. The process and apparatus as disclosed herein could also be used in a two-step operation for removing both methane and ethane from mixtures with nitrogen. In the first step ethane is separated from the methane-nitrogen mixture and in the second step methane is separated from nitrogen.

Although preferred embodiments of the invention have been described in detail, it is contemplated that modifications of the process and the apparatus may be made and that some features may be employed without others, all within the spirit thereof as set forth herein.

What is claimed is:

1. A process for upgrading a contaminated, impurity-containing nitrogen gas mixture having moisture and carbon dioxide contaminants and oxygen and argon impurities by low temperature rectification including the steps of providing a contaminated, impure nitrogen gas mixture stream at a pressure below about 75 p.s.i.g.; passing said mixture to a reversible heat exchange zone; cooling said impurity-containing nitrogen gas mixture in said reversible heat exchange zone to about its dew point thereby condensing said moisture and carbon dioxide contaminants in said reversible heat exchange zone; withdrawing the cooled impurity-containing nitrogen gas mixture; diverting a portion of said impurity-containing nitrogen gas mixture to a non-reversing heat exchange zone for further cooling of said diverted portion; recombining said diverted portion with said impurity-containing nitrogen gas mixture for passage to a rectification zone; contacting the impurity-containing nitrogen gas mixture in said rectification zone with a nitrogen reflux liquid thereby transferring substantially all of the oxygen and argon impurities in said gas mixture to said reflux liquid and producing a high-purity nitrogen effluent vapor; dividing said high-purity nitrogen effluent vapor into a product stream and a vapor stream; passing said high-purity product stream to said non-reversing heat exchange zone for partial warming; passing the partially warmed high-purity product stream to said reversing heat exchange zone for further warming; withdrawing a portion of the further warmed high-purity product stream from said reversing heat exchange zone from an intermediate thermal level therein and combining said withdrawn portion with said high-purity vapor stream; removing the impurity-containing reflux liquid from said rectification zone; heat exchanging said high-purity nitrogen vapor stream and said withdrawn portion of the product stream with said impurity-containing reflux liquid in a condensing zone thereby liquefying said high-purity nitrogen vapor stream and said withdrawn portion of the high-purity product and evaporating said impure reflux liquid; and returning said liquefied high-purity vapor and withdrawn product to said rectification zone as at least part of said nitrogen reflux liquid.

2. A process for upgrading a contaminated, impurity-containing nitrogen gas mixture having moisture and carbon dioxide contaminants and oxygen and argon impurities by low temperature rectification including the steps of providing a contaminated, impure nitrogen gas mixture stream at a pressure below about 75 p.s.i.g.; passing said mixture to a reversible heat exchange zone; cooling said impurity-containing nitrogen gas mixture in said reversible heat exchange zone to about its dew point thereby condensing said moisture and carbon dioxide contaminants in said reversible heat exchange zone; withdrawing the cooled impurity-containing nitrogen gas mixture; diverting a portion of said impurity-containing nitrogen gas mixture to a non-reversing heat exchange zone for further cooling of said diverted portion; recombining said diverted portion with said impurity-containing nitrogen gas mixture for passage to a rectification zone; contacting the impurity-containing nitrogen gas mixture in said rectification zone with a nitrogen reflux liquid thereby transferring substantially all of the oxygen and argon impurities in said gas mixture to said reflux liquid and producing a high purity nitrogen effluent vapor; dividing said high-purity nitrogen effluent vapor into a product stream and a vapor stream; passing said high-purity product stream to said non-reversing heat exhange zone for partial warming; passing the partially warmed high-purity product stream to said reversing heat exchange zone for further warming; withdrawing a portion of the further warmed high-purity product stream from said reversing heat exchange zone from an intermediate thermal level therein and combining said withdrawn portion with said high-purity vapor stream; removing the impurity-containing reflux liquid from said rectification zone; heat exchanging said high-purity nitrogen vapor stream and said withdrawn portion of the product stream with said impurity-containing reflux liquid in a condensing zone thereby liquefying said high-purity nitrogen vapor stream and said withdrawn portion of the high-purity product and evaporating said impure reflux liquid; returning said liquefied high-purity vapor and withdrawn product to said rectification zone as at least part of said nitrogen reflux liquid; and work-expanding said impure evaporated reflux liquid to provide low temperature refrigeration.

3. A process for upgrading a contaminated, impurity-containing nitrogen gas mixture having moisture and carbon dioxide contaminants and oxygen and argon impurities in low temperature rectification including the steps of providing a contaminated, impure nitrogen gas mixture stream at a pressure below about 75 p.s.i.g.; passing said mixture to a reversible heat exchange zone; cooling said impurity-containing nitrogen gas mixture in said reversible heat exchange zone to about its dew point thereby condensing said moisture and carbon dioxide contaminants in said reversible heat exchange zone; withdrawing the cooled impurity-containing nitrogen gas mixture; diverting a portion of said impurity-containing nitrogen gas mixture to a non-reversing heat exchange zone for further cooling of said diverted portion; recombining said diverted portion with said impurity-containing nitrogen gas mixture for passage to a rectification zone; contacting the impurity-containing nitrogen gas mixture in said rectification zone with a nitrogen reflux liquid thereby transferring substantially all of the oxygen and argon impurities in said gas mixture to said reflux liquid and producing a high-purity nitrogen effluent vapor; dividing said high-purity nitrogen effluent vapor into a product stream and a vapor stream; passing said high-purity product stream to said non-reversing heat exchange zone for partial warming; passing the partially warmed high-purity product stream to said reversing heat exchange zone for further warming; withdrawing a portion of the further warmed high-purity product stream from said reversing heat exchange zone from an intermediate thermal level therein and combining said withdrawn portion with said high-purity vapor stream; removing the impurity-containing reflux liquid from said rectification zone; heat exchanging said high-purity nitrogen vapor stream and said withdrawn portion of the product stream with said impurity-containing reflux liquid in a condensing zone thereby liquefying said high-purity nitrogen vapor stream and said withdrawn portion of the high-purity product and evaporating said impure reflux liquid; returning said liquefied high-purity vapor and withdrawn product to said rectification zone as at least part of said nitrogen reflux liquid; and providing a cold nitrogen liquid from an independent source to said condensing zone to provide low temperature refrigeration.

4. A process for upgrading a contaminated, impurity-containing nitrogen gas mixture having moisture and carbon dioxide contaminants and oxygen and argon impurities by low temperature rectification according to claim 3 wherein the cold nitrogen liquid provided from an independent source has a purity at least equal to the purity of the high-purity product stream to permit passing a portion of said nitrogen liquid directly to said rectification zone as at least part of the reflux liquid therefor.

5. Apparatus for upgrading a contaminated, impurity-containing nitrogen gas mixture having moisture and carbon dioxide contaminants and oxygen and argon impurities by low temperature rectification including means by which said contaminated, impurity-containing gas mixture is supplied at a pressure below about 75 p.s.i.g.; means for cooling said contaminated impurity-containing nitrogen gas in a first reversing path of a reversing heat exchange zone to about the dew point of said impurity-containing nitrogen gas; means for withdrawing the cooled impurity-containing nitrogen gas substantially free of said contaminants from said reversing heat exchange zone; means for diverting a portion of said cooled impurity-containing nitrogen gas mixture to a first path in a non-reversing heat exchange zone for further cooling; means for recombining said further cooled portion with said cooled impurity-containing nitrogen gas; rectifying means for contacting said impurity-containing nitrogen gas with a nitrogen reflux liquid; conduit means for withdrawing a high-purity nitrogen effluent from said rectifying means; means associated with said conduit means for dividing said high-purity nitrogen effluent into a product stream and a vapor stream; withdrawal means communicating with said rectifying means for withdrawing the impurity-containing nitrogen reflux liquid from said rectification means; conduit means passing said high-purity nitrogen product stream to a second path in said non-reversing heat exchange zone; means for passing said high-purity nitrogen product from said non-reversing heat exchange zone to a second path in said reversing heat exchange zone; means for withdrawing a portion of said high-purity nitrogen product from said reversing heat exchange zone; means for combining said withdrawn high-purity nitrogen product with said high-purity vapor stream; a reflux condenser communicating with said combined nitrogen vapor streams and said reflux liquid withdrawal means for heat exchanging said combined withdrawn high-purity nitrogen product and said high-purity vapor stream with said withdrawn impurity-containing nitrogen reflux liquid to liquify said nitrogen vapor streams; and means communicating with said condenser for returning the liquefied high-purity vapor and withdrawn product to said rectification means.

References Cited by the Examiner

UNITED STATES PATENTS

| | | | |
|---|---|---|---|
| 2,537,044 | 1/51 | Garbo | 62—14 |
| 2,560,469 | 7/51 | Ogorzaly | 62—14 |
| 2,673,456 | 3/54 | Scharmann | 62—13 |
| 2,715,323 | 8/55 | Johnson | 62—14 |
| 2,729,954 | 1/56 | Etienne | 62—28 |
| 2,833,127 | 5/58 | Vesque | 62—39 |
| 2,846,853 | 8/58 | Matsch | 62—14 |
| 2,866,321 | 12/58 | Fuchs | 62—13 |
| 2,908,144 | 10/59 | First et al. | 62—13 |
| 2,918,801 | 12/59 | First | 62—14 |
| 2,918,802 | 12/59 | Grunberg | 62—38 |
| 2,982,108 | 5/61 | Grunberg et al. | 62—28 |
| 3,021,682 | 2/62 | Baker et al. | 62—28 X |

NORMAN YUDKOFF, *Primary Examiner.*

ROBERT O'LEARY, *Examiner.*